United States Patent
Haven et al.

(10) Patent No.: US 7,912,315 B2
(45) Date of Patent: *Mar. 22, 2011

(54) METHOD AND SYSTEM FOR REDUCING ARTIFACTS IN IMAGE DETECTION

(75) Inventors: Richard E. Haven, Sunnyvale, CA (US); Shalini Venkatesh, Santa Clara, CA (US)

(73) Assignee: Aptina Imaging Corporation, Grand Cayman (KY)

(*) Notice: Subject to any disclaimer, the term of this patent is extended or adjusted under 35 U.S.C. 154(b) by 0 days.

This patent is subject to a terminal disclaimer.

(21) Appl. No.: 12/540,474

(22) Filed: Aug. 13, 2009

(65) Prior Publication Data

US 2010/0014779 A1    Jan. 21, 2010

Related U.S. Application Data

(62) Division of application No. 10/882,038, filed on Jun. 30, 2004, now Pat. No. 7,593,586.

(51) Int. Cl.
*G06K 9/00* (2006.01)
*G06K 9/40* (2006.01)

(52) U.S. Cl. .................................. 382/274; 382/141
(58) Field of Classification Search .............. 382/275, 382/141

See application file for complete search history.

(56) References Cited

U.S. PATENT DOCUMENTS

| | | |
|---|---|---|
| 4,587,617 A | 5/1986 | Barker et al. |
| 5,524,075 A | 6/1996 | Rosseau et al. |
| 5,710,842 A | 1/1998 | Lee |
| 6,282,307 B1 | 8/2001 | Armato, III et al. |
| 6,668,097 B1 | 12/2003 | Hu et al. |
| 6,681,037 B1 | 1/2004 | Koljonen |
| 2005/0163397 A1 | 7/2005 | Baldwin |

*Primary Examiner* — Aaron W Carter
*Assistant Examiner* — Hadi Akhavannik
(74) *Attorney, Agent, or Firm* — RatnerPrestia

(57) ABSTRACT

An imager captures light reflecting off an object of interest and generates two or more images of the object. A controller identifies artifacts in one of the captured images and defines one or more non-interpretation regions in a binary image. The non-interpretation regions include pixels representative of the artifacts and do not include pixels representative of the object of interest. The controller performs pixel operations on the pixels in the binary image to reduce a number of artifacts in a final image.

12 Claims, 6 Drawing Sheets

US 7,912,315 B2

METHOD AND SYSTEM FOR REDUCING ARTIFACTS IN IMAGE DETECTION

CROSS REFERENCE TO RELATED APPLICATIONS

This application is a divisional of U.S. application Ser. No. 10/882,038 filed Jun. 30, 2004, which is incorporated herein by reference in its entirety.

BACKGROUND

There are a number of applications in which it is of interest to detect or image an object. The object may be detected in daylight or in darkness, depending on the application. Wavelength-encoded imaging is one technique for detecting an object, and typically involves detecting light reflecting off the object at two or more particular wavelengths. Images of the object are captured using the reflected light and the presence of the object is then detected in the images. Light reflecting off elements other than the object result in artifacts in the captured images.

FIG. 1 is a graphic illustration of an image in accordance with the prior art. Image 100 includes object 102 and artifact 104. Object 102 is the object to be detected, but artifact 104 can make it difficult to detect object 102. A system designed to detect object 102 may mistake artifact 104 for object 102, thereby resulting in a false detection of object 102. Alternatively, the system may be unable to distinguish object 102 from artifact 104 and therefore fail to detect the presence of object 102 in image 100.

SUMMARY

In accordance with the invention, a method and system for reducing artifacts in image detection are provided. An imager captures light reflecting off an object of interest and generates two or more images of the object. A controller identifies one or more non-interpretation regions in one of the captured images and uses the non-interpretation regions to reduce a number of artifacts in a final a final image.

DETAILED DESCRIPTION

The following description is presented to enable one skilled in the art to make and use embodiments of the invention, and is provided in the context of a patent application and its requirements. Various modifications to the disclosed embodiments will be readily apparent to those skilled in the art, and the generic principles herein may be applied to other embodiments. Thus, the invention is not intended to be limited to the embodiments shown, but is to be accorded the widest scope consistent with the appended claims and with the principles and features described herein. It should be understood that the drawings referred to in this description are not drawn to scale.

Techniques for detecting one or both pupils in a subject's eyes are included in the detailed description as exemplary systems that use image detection. Embodiments in accordance with the invention, however, are not limited to these implementations and include a variety of image detection applications. For example, embodiments in accordance with the invention include the detection of movement along an earthquake fault, the detection of the presence, attentiveness, or location of a person or subject, and the detection of moisture in a manufacturing subject. Additionally, embodiments in accordance with the invention also include medical and biometric applications, such as, for example, systems that detect fluids or oxygen in tissue and systems that identify individuals using their eyes or facial features.

Some embodiments in accordance with the invention detect one or more objects using wavelength-encoded imaging, while other embodiments in accordance with the invention detect one or more objects using time-encoded imaging. With time-encoded imaging, multiple images of an object or objects are captured in sequential frames using light propagating at one or more wavelengths.

Figure 1:
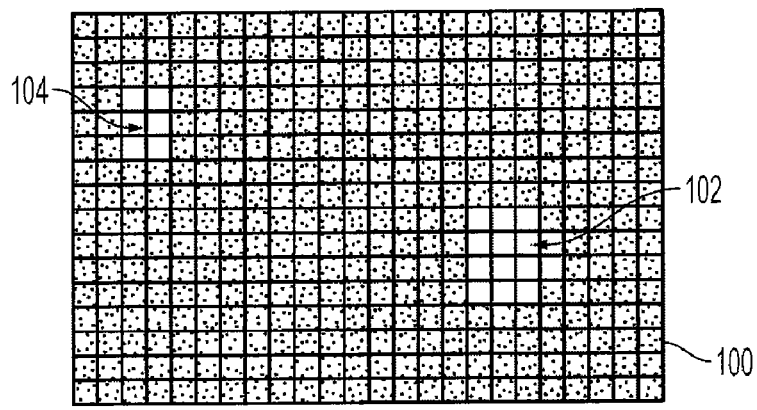
FIG. 1 is a graphic illustration of an image in accordance with the prior art.
Figure 2:
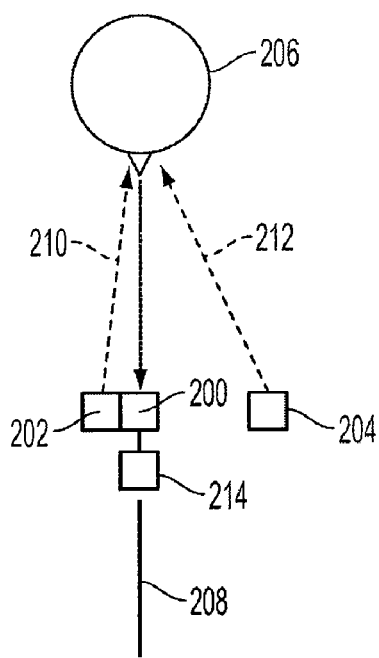
FIG. 2 is a diagram of a first system for pupil detection in an embodiment in accordance with the invention.

With reference to the figures and in particular with reference to FIG. 2, there is shown a diagram of a first system for pupil detection in an embodiment in accordance with the invention. The system includes imager 200 and light sources 202, 204. Light sources 202, 204 are shown on opposite sides of imager 200 in the FIG. 2 embodiment. In other embodiments in accordance with the invention, light sources 202, 204, may be located on the same side of imager 200. Light sources 202, 204 may also be replaced by a single broadband light source emitting light at two or more different wavelengths, such as the sun for example.

Two images are taken of the face and/or eyes of subject 206 using imager 200. One of the images is taken using light source 202, which is close to or on axis 208 of the imager 200 ("on-axis light source"). The second image is taken using light source 204 that is located at a larger angle away from the axis 208 of the imager 200 ("off-axis light source"). When eyes of the subject 206 are open, the difference between the images highlights the pupils of the eyes. This is because specular reflection from the retina is detected only in the on-axis image. The diffuse reflections from other facial and environmental features are largely cancelled out, leaving the pupils as the dominant feature in the differential image. This can be used to infer the subject's 206 eyes are closed when the pupils are not detectable in the differential image.

The amount of time eyes of subject 206 are open or closed can be monitored against a threshold in this embodiment in accordance with the invention. Should the threshold not be satisfied (e.g. the percentage of time the eyes are open falls below the threshold), an alarm or some other action can be taken to alert subject 206. The frequency or duration of blinking may be used as a criteria in other embodiments in accordance with the invention.

In the embodiment of FIG. 2, differential reflectivity off a retina of subject 206 is dependent upon angle 210 between light source 202 and axis 208 of imager 200, and angle 212 between light source 204 and axis 208. In general, making angle 210 smaller will increase the retinal return. As used herein, "retinal return" refers to the intensity (brightness) that is reflected off the back of the eye of subject 206 and detected at imager 200. "Retinal return" is also used to include reflection from other tissue at the back of the eye (other than or in addition to the retina). Accordingly, angle 210 is selected such that light source 202 is on or close to axis 208. In this embodiment in accordance with the invention, angle 210 is typically in the range from approximately zero to two degrees.

In general, the size of angle 212 is chosen so that only low retinal return from light source 204 will be detected at imager 200. The iris (surrounding the pupil) blocks this signal, and so pupil size under different lighting conditions should be considered when selecting the size of angle 212. In this embodiment in accordance with the invention, angle 212 is typically in the range from approximately three to fifteen degrees. In other embodiments in accordance with the invention, the size of angles 210, 212 may be different. For example, the characteristics of a particular subject may determine the size of angles 210, 212.

Light sources 202, 204 emit light at different wavelengths that yield substantially equal image intensity (brightness) in this embodiment in accordance with the invention. Even though light sources 202, 204 can be at any wavelength, the wavelengths selected in this embodiment are chosen so that the light will not distract the subject and the iris of the eye will not contract in response to the light. Light sources 202, 204 are implemented as light-emitting diodes (LEDs) or multimode semiconductor lasers having infrared or near-infrared wavelengths in this embodiment in accordance with the invention. Each light source 202, 204 may be implemented as one, or multiple, sources.

The system further includes controller 214, which may be dedicated to the system or may be a shared device. Frames of image information are generated by imager 200 and processed and analyzed by controller 214 to distinguish a pupil (or pupils) from other features within the field of view of imager 200. The reduction of artifacts in the images is performed in controller 214 in this embodiment in accordance with the invention.

Figure 3:
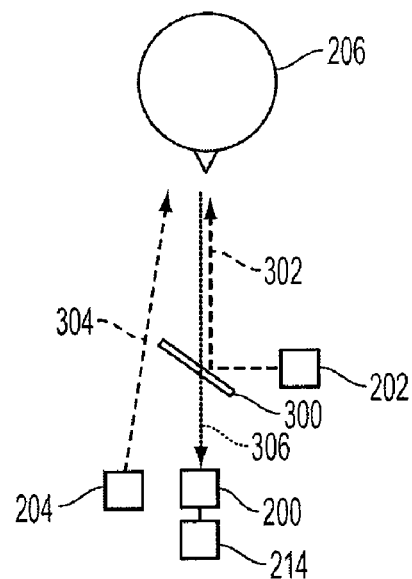
FIG. 3 is a diagram of a second system for pupil detection in an embodiment in accordance with the invention.

FIG. 3 is a diagram of a second system for pupil detection in an embodiment in accordance with the invention. The system includes imager 200, on-axis light source 202, off-axis light source 204, and controller 214 from FIG. 2. The system also includes beam splitter 300. On-axis light source 202 emits a beam of light towards beam splitter 300. Beam splitter 300 splits the on-axis light into two segments, with one segment 302 directed towards subject 206. A smaller yet effective on-axis angle of illumination is permitted when beam splitter 300 is placed between imager 200 and subject 206.

Off-axis light source 204 also emits beam of light 304 towards subject 206. Light from segments 302, 304 reflects off subject 206 towards beam splitter 300. Light from segments 302, 304 may simultaneously reflect off subject 206 or alternately reflect off subject 206, depending on when light sources 202, 204 emit light. Beam splitter 300 splits the reflected light into two segments and directs one segment 306 towards imager 200. Imager 200 captures two images of subject 206 using the reflected light and transmits the images to controller 214 for processing.

Figure 4A:
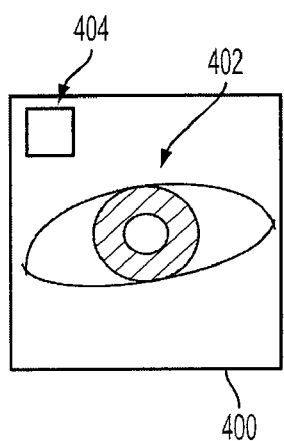
FIG. 4A is a graphic illustration a first image generated with an on-axis light source in accordance with the embodiments of FIG. 2 and FIG. 3.

Referring now to FIG. 4A, there is shown a graphic illustration of a first image generated with an on-axis light source in accordance with the embodiments of FIG. 2 and FIG. 3. Image 400 shows an eye 402 that is open and artifact 404. Eye 402 has a bright pupil due to a strong retinal return created by one or more light sources. If eye 402 had been closed, or nearly closed, the bright pupil would not be detected and imaged.

Figure 4B:
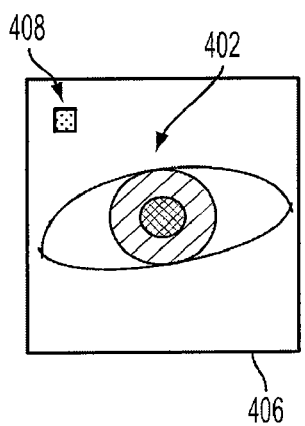
FIG. 4B is a graphic illustration a second image generated with an off-axis light source in accordance with the embodiments of FIG. 2 and FIG. 3.

FIG. 4B is a graphic illustration of a second image generated with an off-axis light source in accordance with the embodiments of FIG. 2 and FIG. 3. Image 406 may be taken at the same time as image 400, or it may be taken in an alternate frame (successively or non-successively). Image 406 illustrates eye 402 with a normal, dark pupil and another artifact 408. If the eye had been closed or nearly closed, the dark pupil would not be detected and imaged.

Figure 4C:
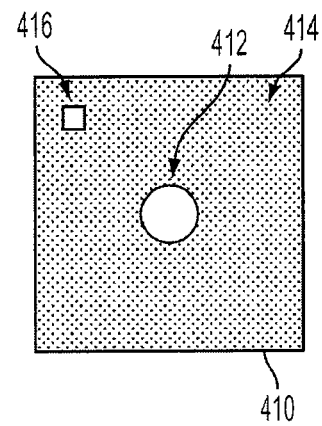
FIG. 4C is a graphic illustration of a difference image resulting from the difference between the FIG. 4A image and the FIG. 4B image.

FIG. 4C is a graphic illustration of a difference image resulting from the difference between the FIG. 4A image and the FIG. 4B image. By taking the difference between images 400 and 406, difference image 410 includes a relatively bright spot 412 against a relatively dark background 414 when the eye is open. When the eye is closed or nearly closed, bright spot 412 will not be shown in difference image 410.

Difference image 410 also includes artifact 416. Because artifact 404 is brighter than artifact 408 in this embodiment, artifact 416 is created in difference image 410. A method for reducing artifacts is discussed in more detail in conjunction with FIGS. 8-13.

FIGS. 4A-4C illustrate one eye of a subject. Both eyes may be monitored in other embodiments in accordance with the invention. It will also be understood that a similar effect will be achieved if the images include other features of the subject (e.g. other facial features), as well as features of the subject's environment. These features will largely cancel out in a manner similar to that just described.

Figure 5:
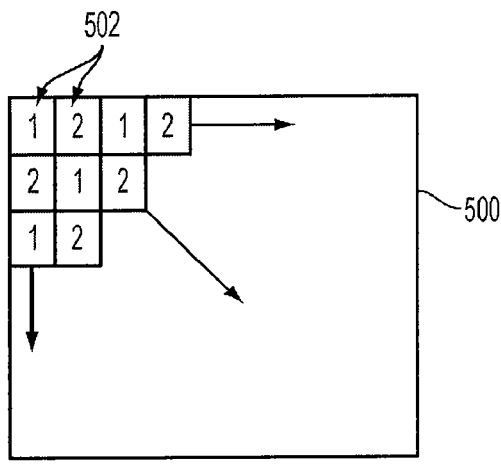
FIG. 5 is a top-view of a sensor that may be implemented in the embodiments of FIG. 2 and FIG. 3.

Referring now to FIG. 5, there is shown a top-view of a sensor that may be implemented in the embodiments of FIG. 2 and FIG. 3. Sensor 500 is incorporated into imager 200 and is configured as a complementary metal-oxide semiconductor (CMOS) imaging sensor. Sensor 500 may be implemented with other types of imaging devices in other embodiments in accordance with the invention, such as, for example, a charge-coupled device (CCD) imager.

Patterned filter layer 502 is formed on sensor 500 using different filter materials shaped into a checkerboard pattern. The two filters are determined by the wavelengths being used by light sources 202, 204. For example, in this embodiment in accordance with the invention, patterned filter layer 502 includes regions (identified as 1) that include a filter material for selecting the wavelength used by light source 202, while other regions (identified as 2) include a filter material for selecting the wavelength used by light source 204.

In the FIG. 5 embodiment, patterned filter layer 502 is deposited as a separate layer of sensor 500, such as, for example, on top of an underlying layer, using conventional deposition and photolithography processes while still in wafer form. In another embodiment in accordance with the invention, patterned filter layer 502 can be can be created as a separate element between sensor 500 and incident light. Additionally, the pattern of the filter materials can be configured in a pattern other than a checkerboard pattern. For example, patterned filter layer 502 can be formed into an interlaced striped or a non-symmetrical configuration (e.g. a 3-pixel by 2-pixel shape). Patterned filter layer 502 may also be incorporated with other functions, such as color imagers.

Various types of filter materials can be used in patterned filter layer 502. In this embodiment in accordance with the invention, the filter materials include polymers doped with pigments or dyes. In other embodiments in accordance with the invention, the filter materials may include interference filters, reflective filters, and absorbing filters made of semiconductors, other inorganic materials, or organic materials.

Figure 6:
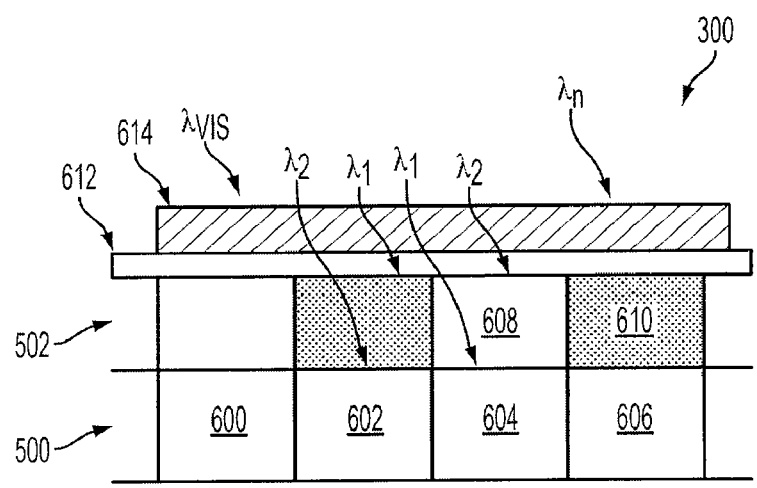
FIG. 6 is a cross-sectional diagram of an imager that may be implemented in the embodiments of FIG. 2 and FIG. 3.

FIG. 6 is a cross-sectional diagram of an imager that may be implemented in the embodiments of FIG. 2 and FIG. 3. Only a portion of imager 200 is shown in this figure. Imager 200 includes sensor 500 comprised of pixels 600, 602, 604, 606, patterned filter layer 502 including two alternating filter regions 608, 610, glass cover 612, and dual-band narrowband filter 614. Sensor 500 is configured as a CMOS imager and patterned filter layer 502 as two polymers 608, 610 doped with pigments or dyes in this embodiment in accordance with the invention. Each region in patterned filter layer 502 (e.g. a square in the checkerboard pattern) overlies a pixel in the CMOS imager.

Narrowband filter 614 and patterned filter layer 502 form a hybrid filter in this embodiment in accordance with the invention. When light strikes narrowband filter 614, the light at wavelengths other than the wavelengths of light source 202 light source 202 ($\lambda_1$) and light source 204 ($\lambda_2$) is filtered out, or blocked, from passing through the narrowband filter 614. Light propagating at visible wavelengths ($\lambda_{VIS}$) and wavelengths ($\lambda_n$) is filtered out in this embodiment, where $\lambda_n$ represents a wavelength other than $\lambda_1$, $\lambda_2$, and $\lambda_{VIS}$. Light propagating at or near wavelengths $\lambda_1$ and $\lambda_2$ transmit through narrowband filter 614. Thus, only light at or near the wavelengths $\lambda_1$ and $\lambda_2$ passes through glass cover 612. Thereafter, polymer 608 transmits the light at wavelength $\lambda_1$ while blocking the light at wavelength $\lambda_2$. Consequently, pixels 600 and 604 receive only the light at wavelength $\lambda_1$, thereby generating the image taken with the on-axis light source 202.

Polymer 610 transmits the light at wavelength $\lambda_2$ while blocking the light at wavelength $\lambda 1$, so that pixels 602 and 606 receive only the light at wavelength $\lambda_2$. In this manner, the image taken with off-axis light source 204 is generated. The shorter wavelength $\lambda_1$ is associated with on-axis light source 202, and the longer wavelength $\lambda_2$ with off-axis light source 204 in this embodiment in accordance with the invention. The shorter wavelength $\lambda_1$, however, may be associated with off-axis light source 204 and the longer wavelength $\lambda_2$ with on-axis light source 202 in other embodiments in accordance with the invention.

Narrowband filter 614 is a dielectric stack filter in this embodiment in accordance with the invention. Dielectric stack filters are designed to have particular spectral properties. In this embodiment in accordance with the invention, the dielectric stack filter is formed as a dual-band narrowband filter. Narrowband filter 614 is designed to have one peak at $\lambda_1$ and another peak at $\lambda_2$.

Figure 7:
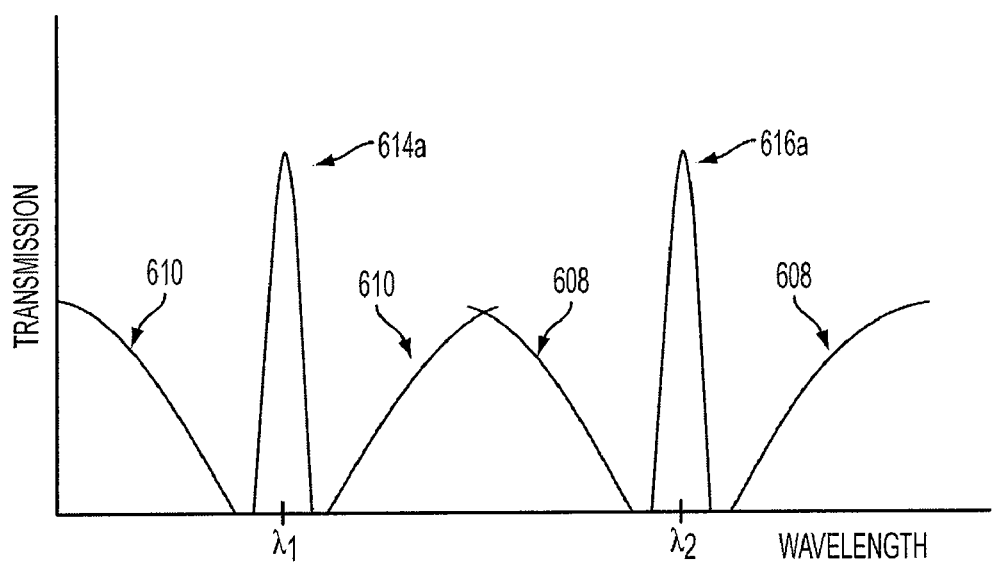
FIG. 7 depicts the spectrum for the imager of FIG. 6.

FIG. 7 depicts the spectrum for the imager of FIG. 6. The hybrid filter (combination of the polymer filters 608, 610 and narrowband filter 614) effectively filters out all light except for the light at or near the wavelengths of the light sources ($\lambda_1$ and $\lambda_2$). Narrowband filter 614 transmits a narrow amount of light at or near the wavelengths of interest, $\lambda_1$ and $\lambda_2$, while blocking the transmission of light at other wavelengths. Patterned filter layer 502 is then used to discriminate between $\lambda_1$ and $\lambda_2$. Wavelength $\lambda 1$ is transmitted through filter 608 (and not through filter 610), while wavelength $\lambda_2$ is transmitted through filter 610 (and not through filter 608).

Those skilled in the art will appreciate patterned filter layer 502 provides a mechanism for selecting channels at pixel spatial resolution. In this embodiment in accordance with the invention, channel one is associated with the on-axis image and channel two with the off-axis image. In other embodiments in accordance with the invention, channel one may be associated with the off-axis image and channel two with the on-axis image.

Figure 8:
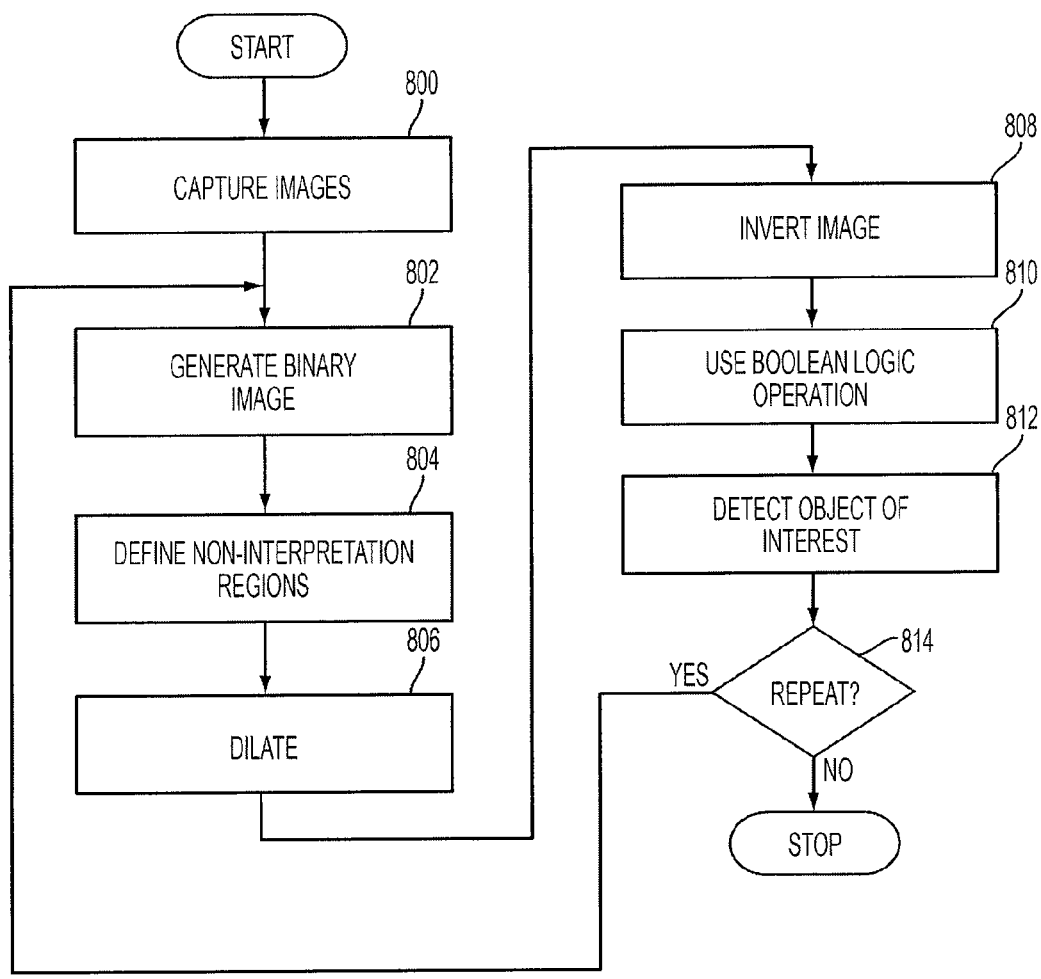
FIG. 8 is a flowchart of a method for reducing artifacts in an embodiment in accordance with the invention.

Referring now to FIG. 8, there is shown a flowchart of a method for reducing artifacts in an embodiment in accordance with the invention. Initially two images are captured, as shown in block 800. The method is described with reference to two images in order to simplify the description. Embodiments in accordance with the invention, however, are not limited in application to two images. Any number of images may be captured and processed in other embodiments in accordance with the invention.

Figure 9:
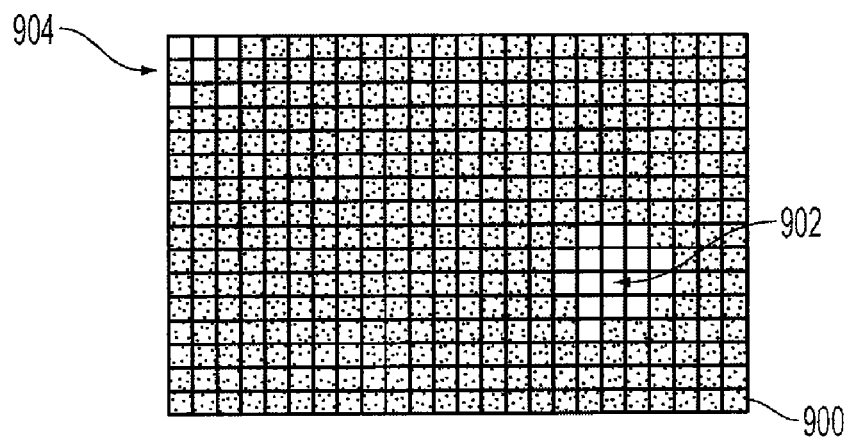
FIG. 9 is a graphic illustration of a binary image of a difference image in accordance with the embodiments of FIGS. 2 and 3.

A segmented binary image of one image is generated at block 802. FIG. 9 is a graphic illustration of a binary image of a difference image in accordance with the embodiments of FIGS. 2 and 3. Image 900 includes object of interest 902 and artifact 904. In the embodiments of FIGS. 2 and 3, the captured images are configured as sub-frames. One sub-frame is captured by the pixels identified as region 1 in FIG. 5 and the other sub-frame is captured by the pixels identified as region 2. A difference image as described with reference to FIG. 4C is then generated in order to remove any common features in the two captured sub-frames. Interpolation between pixels in each sub-frame may be carried out when generating the difference image. In accordance with this embodiment, the segmented binary image generated at block 802 is a binary image of the difference image.

In the embodiment of FIG. 9, binary image 900 is generated by applying a threshold to the pixels in the difference image. The threshold may be determined in a number of ways, and may be applied locally or globally. For example, in one embodiment in accordance with the invention, the threshold is determined by applying a percentage to the image. As one example, 0.3% of the pixels are set to white and the remaining pixels are set to black. In another embodiment in accordance with the invention, the threshold is set to a particular binary value, such as 200. Only those pixels with binary values over 200 are then set to white and the remaining pixels are set to black.

In another embodiment in accordance with the invention, the images captured at block 800 are configured as individual images captured sequentially. The amount of time that passes prior to capturing the next sequential image is determined by the application. For example, if an object is not expected to move often, more time can pass between capturing images than when the object moves frequently. In accordance with this embodiment, the segmented binary image generated at block 802 is a binary image of one of the captured images.

Referring again to FIG. 8, one or more non-interpretation regions are defined at block 804. The areas of an image defined as non-interpretation regions depend upon the application. One of the images captured in block 800 is used to define the non-interpretation regions. For example, in the pupil detection systems of FIG. 2 and FIG. 3, the object of interest (i.e., the bright pupil in FIG. 4A) is captured with the on-axis light source and image 400 is configured as the first sub-frame. Image 406 is configured as a second sub-frame and does not include the object of interest (i.e., the pupil is dark in FIG. 4B). Because pupil reflection is absent in image 406, any bright region, such as artifact 408, must be artifactual. The second sub-frame image can therefore be used to define the non-interpretation regions in the embodiments of FIG. 2 and FIG. 3. In other embodiments in accordance with the invention, other criteria may be used to define the regions of non-interest. For example, regions of non-interest may be determined by their shape, size, location, or color (e.g., white or black pixels).

Figure 10:
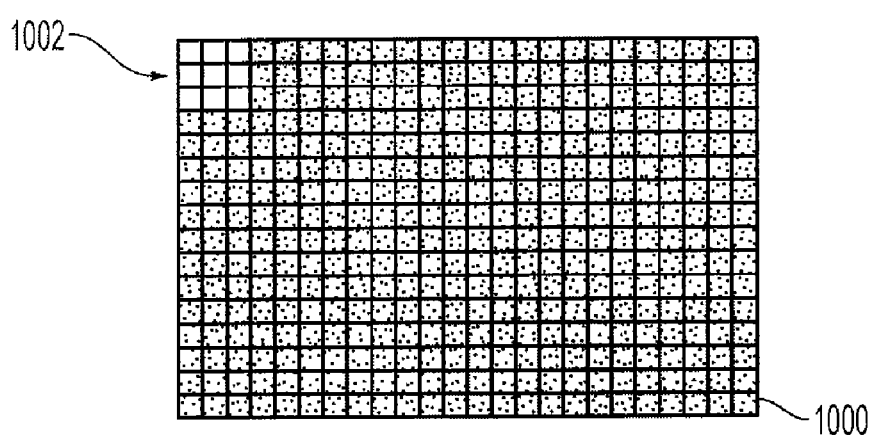
FIG. 10 is a graphic illustration of a second binary image in an embodiment in accordance with the invention.

In this embodiment in accordance with the invention, the one or more non-interpretation regions are defined by applying a second threshold to the pixels in the image. The second threshold can be determined in any desired manner. Application of the threshold generates a binary image of the selected image. FIG. 10 is a graphic illustration of a second binary image in an embodiment in accordance with the invention. Image 1000 includes artifact 1002.

Figure 11:
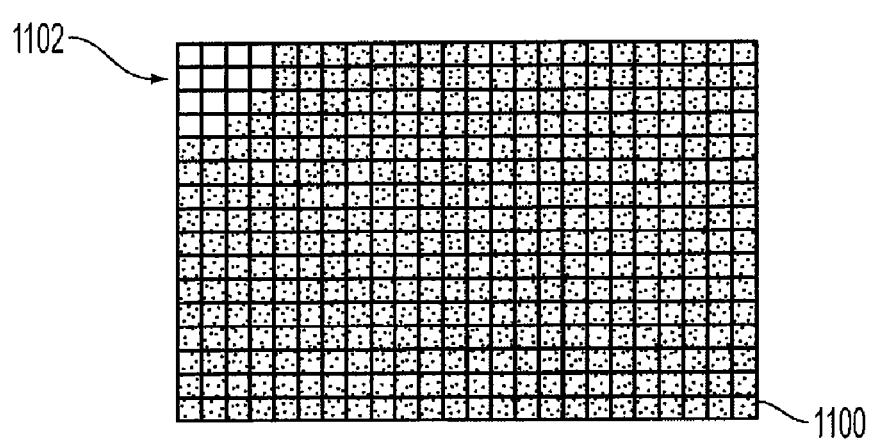
FIG. 11 is a graphic illustration of the second binary image after performing a dilation operation on the second binary image.

A dilation operation is then performed on image 1000, as shown in block 806. A dilation operation increases the number of pixels that form one or more blobs in an image. FIG. 11 is a graphic illustration of the second binary image after performing a dilation operation on the second binary image. As shown in FIG. 11, image 1100 includes artifact 1102, which is larger in size than artifact 1002 in image 1000.

Figure 12:
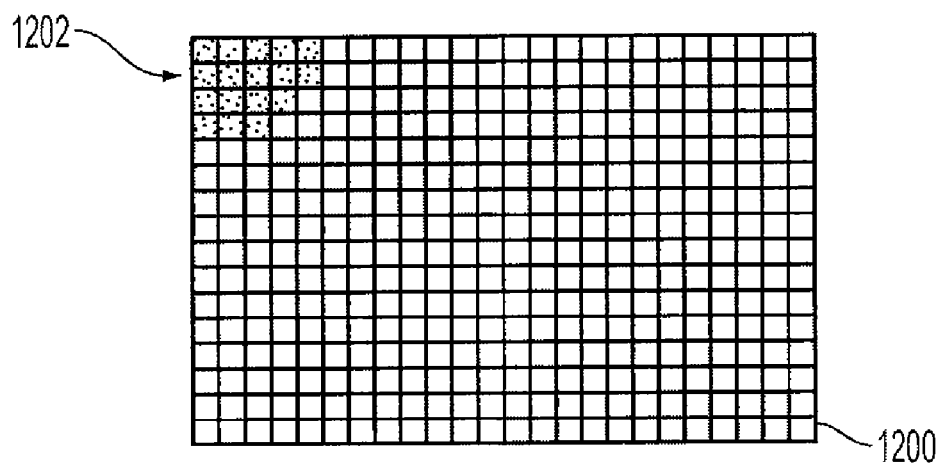
FIG. 12 is a graphic illustration of the binary image of FIG. 11 after inverting the FIG. 11 image.

The FIG. 11 image is then inverted, as shown in block 808 of FIG. 8. This causes the white pixels in FIG. 11 to become black pixels and the black pixels to become white pixels. FIG. 12 is a graphic illustration of the binary image of FIG. 11 after inverting the FIG. 11 image.

Figure 13:
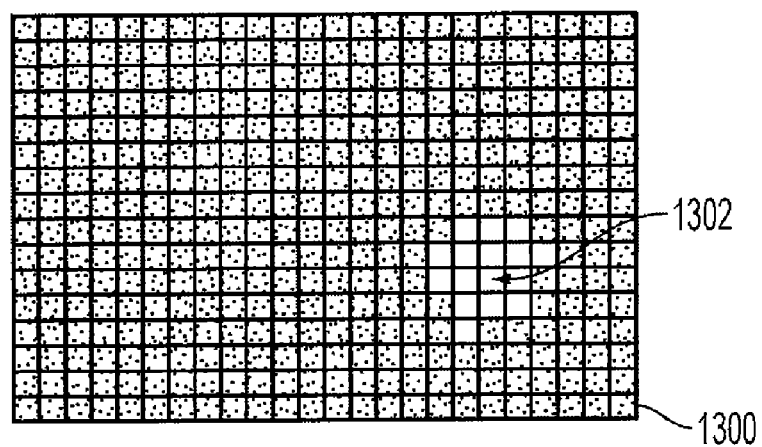
FIG. 13 is a graphic illustration of a final image generated by the method for reducing artifacts shown in FIG. 8.

A Boolean logic operation is then performed at block 810. In this embodiment in accordance with the invention, a Boolean AND operation is performed with the first binary image generated at block 802 and the inverted image generated at block 808. FIG. 13 is a graphic illustration of a final image generated by the method for reducing artifacts shown in FIG. 8. Final image 1300 includes only the object of interest 1302. The artifact present in the image of FIG. 11 has been removed.

The object of interest is then detected at block 812. In the pupil detection systems of FIG. 2 and FIG. 3, for example, object 1302 includes a pupil of a subject. In other embodiments in accordance with the invention, object 1302 may include any type of mobile or stationary object.

A determination is then made at block 814 as to whether blocks 802 through 812 should be repeated. If not, the process ends. Otherwise, the method returns to block 802 and repeats a desired number of times. Whether or not blocks 802-812 are repeated depends upon the application. For example, repeating blocks 802-812 may be desired in a system that provides percentage values regarding the detection and identification of an object (e.g., 80% of pupil identified). Other systems may provide statistical confidence levels regarding the detection and identification of an object or objects of interest. Additionally, repeating blocks 802-812 may be desired in intelligent systems that learn from, and therefore improve the performance of, the detection and identification process.

Other embodiments in accordance with the invention may perform the blocks depicted in FIG. 8 in a different order. Additionally, other embodiments in accordance with the invention may include some, but not all of the blocks illustrated in FIG. 8. For example, block 810 may be eliminated and a NAND operation performed at block 812.

What is claimed:

1. A system, comprising:
   an imager for capturing first and second images of an object using light reflected off the object, the first image including illuminated pixels that are part of an object of interest and the second image including illuminated pixels that are not part of the object of interest; and
   a controller connected to the imager for defining and using one or more non-interpretation region based on one of the first image and second image to reduce a number of artifacts in a final image, wherein the controller is configured to:
   compute a difference image between the first image and second image to remove the illuminated pixels that are not part of the object of interest, the difference image including illuminated pixels that are artifacts and the illuminated pixels that are part of the object of interest, wherein the illuminated pixels that are artifacts in the difference image correspond to the illuminated pixels that are not part of the object of interest in the second image;
   generate a binary image from the difference image;
   define the one or more non-interpretation region in the binary image to include the illuminated pixels that are artifacts in the difference image and non-illuminated pixels that are in proximity to the illuminated pixels that are artifacts in the difference image,
   wherein the illuminated pixels that are part of the object of interest in the difference image are excluded from the non-interpretation region; and
   eliminate the illuminated pixels that are artifacts in the difference image which are included in the defined non-interpretation region.

2. The system of claim 1, further comprising a source for emitting light towards the object.

3. The system of claim 1, wherein the imager simultaneously captures the images of the object.

4. The system of claim 3, wherein the images of the object comprise sub-frames.

5. The system of claim 1, wherein the imager successively captures the images of the object.

6. The system of claim 1, wherein the controller generates a first binary image from the first captured image.

7. The system of claim 6, comprising a Boolean NAND operator which performs a Boolean NAND operation between the first binary image and the second binary image.

8. The system of claim 4, wherein the controller computes a difference image between a first sub-frame image of the object and a second sub-frame image of the object.

9. The system of claim 8, wherein the controller computes a binary image of the difference image.

10. The system of claim 9, wherein the controller:
    generates a first sub-frame binary image of one of the sub-frame images;
    performs a dilation operation on one of the sub-frame images to generate a second sub-frame binary image; and
    performs a Boolean logic operation with the first sub-frame binary image and the second sub-frame binary image.

11. The system of claim 10, wherein the controller:
    inverts the second sub-frame binary image; and
    performs a Boolean NAND operation with the first sub-frame binary image and the inverted second sub-frame binary image.

12. The system of claim 10, wherein the controller is configured to perform the Boolean logic operation by performing a Boolean NAND operation with the first sub-frame binary image and the second sub-frame binary image.

* * * * *